Dec. 8, 1970   L. M. HARVEY   3,546,508
SELF-PUMPING LIQUID METAL CURRENT COLLECTOR
Original Filed Aug. 29, 1966

INVENTOR.
LUKE M. HARVEY
BY *James C. Davis Jr.*
HIS ATTORNEY

United States Patent Office

3,546,508
Patented Dec. 8, 1970

3,546,508
SELF-PUMPING LIQUID METAL CURRENT
COLLECTOR
Luke M. Harvey, Schenectady, N.Y., assignor to General
Electric Company, a corporation of New York
Continuation of application Ser. No. 575,859, Aug. 29,
1966. This application Dec. 29, 1969, Ser. No. 888,159
Int. Cl. H02k *13/00*
U.S. Cl. 310—219
1 Claim

ABSTRACT OF THE DISCLOSURE

A self-pumping liquid metal current collector includes a rotor having a stationary current transfer surface and a stator having a stationary current transfer surface spaced from said peripheral current transfer surface by a predetermined clearance. The clearance defines a gap adapted to be charged with conducting liquid metal during operation. A first nozzle and a second nozzle are in the stator communicating with the gap. The nozzles are directed in opposite circumferential directions relative to the peripheral current transfer surface. There is a source of conductive liquid metal communicating with the nozzles, so that circulation of the liquid metal through the gap is established in response to rotation of the rotor regardless of the direction of rotation.

---

This application is a continuation of application Ser. No. 575,859 filed on Aug. 29, 1966.

The present invention pertains to means for circulating liquid metal used for current collection purposes in a dynamoelectric machine.

It is known to employ liquid metals, for example, mercury or sodium-potassium, as the current transfer medium in a gap between relatively rotating members. The liquid metal must be circulated externally of the gap in many applications to effect cooling thereof. Circulation has heretofore been achieved through the agency of external pumps or the like that establish a pressure differential between inlet and outlet passages communicating with the gap. A system of this kind is disclosed in U.S. patent No. 3,211,-936. Auxiliary pumps or the like represent apparatus which is advantageously obviated in the interests of simplifying construction and control requirements, as well as increasing the length of trouble-free service.

Accordingly, it is an object of this invention to provide a rotary liquid metal current collector featuring self-circulation of the liquid metal.

Another object of this invention is to provide a self-pumping liquid metal current collector operable regardless of the direction of rotation of the rotary member to circulate the liquid metal externally.

Yet another object of this invention is to provide self-circulation of liquid metal through a current collector region in quantities tailored to the collector requirements.

Briefly, in a preferred embodiment of this invention the liquid metal inlets and outlets in the stator are disposed in pairs circumferentially spaced about the rotary member. The inlet and outlet of each pair have oppositely directed nozzles opening into the gap between the rotor and stator. The openings of the nozzles into the gap are substantially in tangential alignment with the juxtaposed rotor surface. I have discovered that an arrangement of this kind provides the necessary pressure differential to establish suitable external circulation of the liquid metal under operating conditions and in the absence of external pumping means. Moreover, the symmetry is such that operation is independent of the direction of rotation of the rotor, although the direction of circulation changes. In addition, the circulation increases and decreases with corresponding changes in rotational velocity of the rotor to provide self-regulation compatible with the power output capability of the machine, in the case of a homopolar machine.

Figure 1:
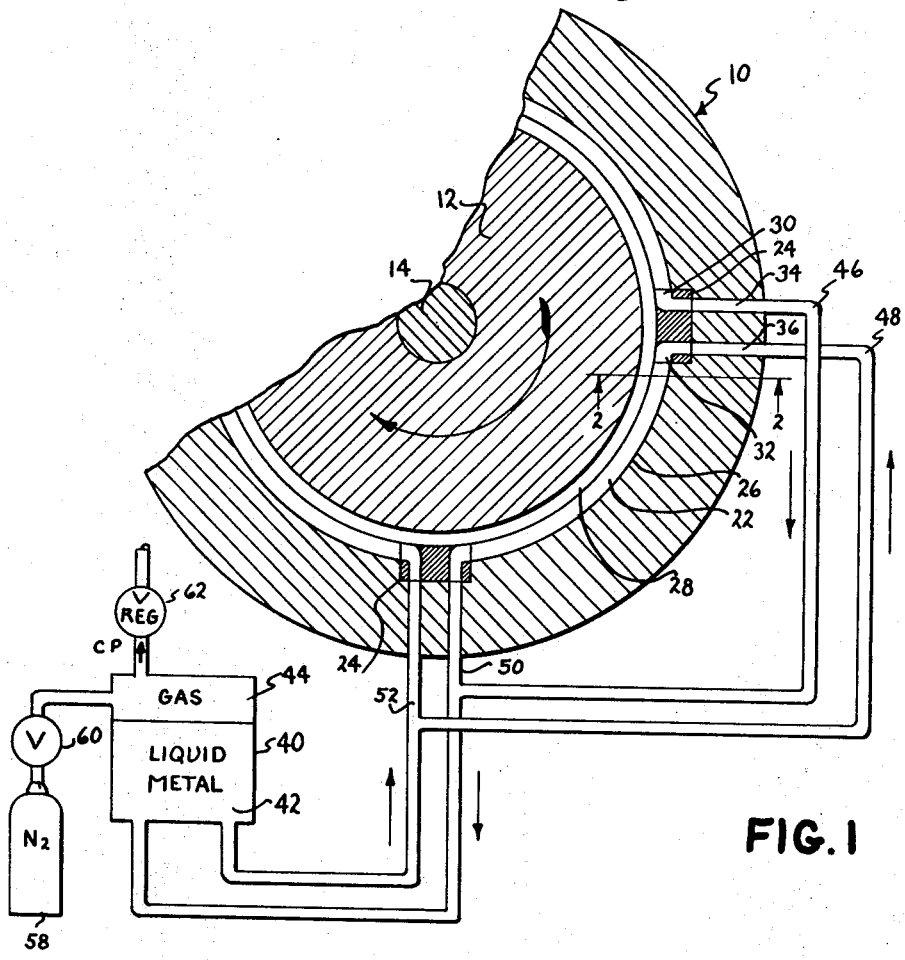
Figure 2:
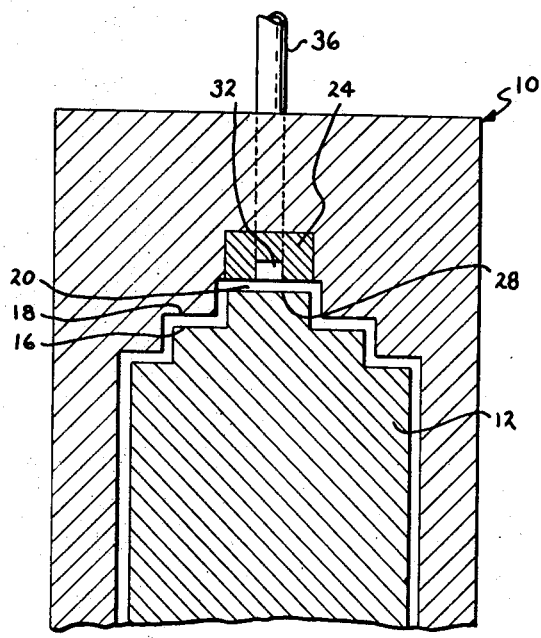

While the specification concludes with claims particularly pointing out and distinctly claiming the subject matter which I regard as my invention, it is believed the invention will be better understood from the following description taken in connection with the accompanying drawings in which:

FIG. 1 is a cross-section view of a current collector with a schematically represented external liquid metal supply system all in accord with the invention; and FIG. 2 is a sectional view taken along lines 2—2 of FIG. 1.

The embodiment of this invention illustrated in FIGS. 1 and 2 comprises a stator, or relatively stationary member, 10 and a rotor 12 mounted on a rotatable shaft 14 or otherwise suitably adapted for rotation within stator 10. An outer peripheral surface 16 of rotor 12 is radially inwardly spaced from a substantially complementary-shaped surface 18 of stator 10, thereby defining an annular gap 20 of approximately uniform spacing or clearance between the rotor 12 and stator 10. In operation, a suitable conductive liquid metal fills gap 20 to provide a current transfer path between the radially outer surfaces of rotor 12 and the corresponding surfaces of stator 10 opposite therefrom. The structure described is suitable for current transfer between rotary and stationary bodies generally, but is particularly useful to transmit the very large magnitude direct currents present in the rotor of a homopolar machine.

In accord with the present invention, an annular pumping groove 22 is provided in stator 10 in the current transfer region and groove 22 is interrupted at circumferentially spaced intervals by liquid metal circulating means 24. The radially outermost surface 26 of groove 22 is radially spaced from the corresponding radially outermost surface 28 of rotor 12 by a distance that is greater than that of the current transfer gap 20. Preferably, the radial clearance between rotor 12 and stator 10 in groove 22 is approximately two times the clearance of gap 20 in order to achieve maximum pumping pressure. The axial dimension of groove 22 advantageously can be selected to be approximately equal to the radial dimension of the groove.

The liquid metal circulating means 24 comprises a pair of nozzles, as 30 and 32, projecting into groove 20. The nozzles 30 and 32 provide openings into the gap that face in opposite directions, so that in each pair one nozzle develops a discharge pressure while the other nozzle provides inlet suction to establish the pressure differential required for external liquid metal circulation. The nozzles 30 and 32 are in back-to-back relationship, as closely spaced as is consistent with sound mechanical design, and the openings preferably are directed substantially tangentially to rotor surface 28 and in the plane of rotation of rotor 12. Fabrication is facilitated by providing each pair of nozzles in an integral block, as illustrated, and the block is welded or otherwise suitably secured to the stator 10. Communicating passages 34 and 36 are drilled or otherwise formed in stator 10 in alignment with the radially outer openings of nozzles 30 and 32, respectively.

The external liquid metal system is illustrated schematically and includes a suitable reservoir 40 having a charge 42 of conductive liquid metal therein and a cover gas 44 that can be slightly above atmospheric pressure. Reservoir 40 is preferably disposed below the level of the machine to facilitate draining of the liquid metal from the gap when desired. In this case it has been found that gas 44 must be pressurized to provide a bias pressure in an amount that varies with the machine speed in order to counteract the centrifugal forces on the liquid. A gas pressure of 3 p.s.i. gauge provides optimum results at a surface speed of 13,000 f.p.m., as does a gas pressure of 5 p.s.i. gauge at 27,000 f.p.m. Means to vary the gas pressure in reservoir 40 are conveniently shown by pressurized gas source 58 communicating with the top of reservoir 40 through valve 60. An adjustable constant pressure vent valve 62 bleeds off excess gas 44. This is a particularly convenient arrangement because in operation, cover gas in the machine becomes entrained in the liquid metal and is thereby continuously supplied to reservoir 40. The outlet from valve 62 is preferably returned to the machine, by means not shown, in order to conserve the gas. The machine is drained of liquid metal, for example when shut down, by venting reservoir 40 directly to the atmosphere.

In one example, charge 42 can be NaK and gas 44 can be nitrogen; however, appropriate other combinations are too numerous and well known to require listing. A heat exchange device (not shown) is advantageously provided in most cases to control the temperature of the liquid metal. Suitable plumbing, as pipes 46 and 48, is provided to connect passages 34 and 36, respectively, with reservoir 40, necessarily at points below the surface of the liquid. Other circulating means 24 are connected in parallel, as by pipes 50 and 52, for example. Parallel connection is desirable to achieve maximum rate of flow.

In operation, circulation of liquid metal through the gap 20 is achieved in the closed supply system described without external pumping means. When rotor 12 is turning in the clockwise direction, as illustrated, nozzle 30 is the liquid metal outlet and nozzle 32 is the liquid metal inlet to gap 20. This relationship reverses for counterclockwise rotation of rotor 12.

The optimum circumferential spacing of circulating means 24 has been found to be in the range from 6 to 9 inches. Thus, in most cases there are provided more than one circulating means per collector, depending upon the inside diameter of the stator. With circumferential spacing less than about 6 inches, a direct transfer between facing nozzles tends to occur without adequate mixing with the remainder of the liquid metal in gap 20, and if the spacing substantially exceeds 9 inches, the rate of flow becomes insufficient for transmitting the maximum current for which the collector would be appropriate otherwise.

In one particularly advantageous embodiment of the invention, the groove 22 is of square cross section and measures ⅛ inch in depth and ⅛ inch in width. The nozzle openings are similarly square and measure ⅛ inch by ⅛ inch. The outermost axially extending surface of rotor 12, used for current collector purposes, is ½ inch in axial dimension and the gap 20 is 0.050 inch. The conductive liquid is sodium-potassium with nitrogen cover gas. With a gas pressure of 3 p.s.i. in reservoir 40 and a rotor surface velocity of 13,000 f.p.m., the measured flow is ¾ gallon per minute per nozzle assembly. With a gas pressure of 5 p.s.i. and a rotor surface velocity of 27,000 f.p.m., the flow rate is 1⅛ gallons per minute per nozzle.

I have found that the expected excessive circulating current losses do not materialize so long as the axial length of the current collecting region is not more than one-half inch and nozzle and gap dimensions are equal to or less than ⅛ inch. With this proviso, the losses introduced by the self-pumping arrangement of this invention are equal to or less than a modest 100 watts per inch of rotor diameter.

The foregoing is a description of an illustrative embodiment of the invention, and it is applicant's intention in the appended claim to cover all forms which fall within the scope of the invention.

What is claimed is:

1. In a liquid metal current collector including a rotor having an outer peripheral current-transfer surface and a stator having a stationary current-transfer surface spaced from said peripheral current-transfer surface by a predetermined clearance and thereby defining a current-transfer gap adapted to be charged with conducting liquid metal during operation; the improvement of liquid metal self-pumping means comprising:

(a) an annular pumping groove in the current-transfer surface of said stator, said groove having a radially outermost surface radially spaced from the radially outermost portion of the current-transfer surface of the rotor by a distance that is greater than the current-transfer gap defined between the respective current-transfer surfaces of said stator and said rotor;

(b) a pair of oppositely directed nozzles in back-to-back relationship opening into and interrupting said pumping groove, said nozzles being equally spaced radially from the axis of rotation of said rotor and said nozzles having openings directed substantially tangentially to the radially outermost portion of the current-transfer surface of said rotor in the plane of rotation thereof to provide an inlet nozzle and an outlet nozzle, respectively, in said pumping groove regardless of the direction of rotation of said rotor, the particular one of said pair of nozzles which is an inlet or an outlet nozzle being dependent upon the direction of rotation of said rotor; and, (c) a source of conductive liquid metal communicating with said nozzles through separate fluid transfer means to provide circulation of liquid metal through a loop including said source in response to rotation of said rotor.

References Cited

UNITED STATES PATENTS 2,845,554   7/1958   Schwab _____ 310—178

MILTON O. HIRSHFIELD, Primary Examiner

G. P. TOLIN, Assistant Examiner

U.S. Cl. X.R.

310—178